United States Patent [19]

Suzuki

[11] Patent Number: 5,434,960

[45] Date of Patent: Jul. 18, 1995

[54] GRAPHIC DATA OUTPUT APPARATUS AND METHOD OF CREATING AND OUTPUTTING GRAPHIC DATA

[75] Inventor: Kyo Suzuki, Kanagawa, Japan

[73] Assignee: NEC Corporation, Tokyo, Japan

[21] Appl. No.: 873,016

[22] Filed: Apr. 24, 1992

[30] Foreign Application Priority Data

Apr. 24, 1991 [JP] Japan .................. 3-122582

[51] Int. Cl.$^6$ ............................................. G06F 15/62
[52] U.S. Cl. .................................... 395/144; 395/137
[58] Field of Search ............... 395/144, 145, 146, 147, 395/155, 161, 100, 137

[56] References Cited

U.S. PATENT DOCUMENTS

| | | | |
|---|---|---|---|
| 4,964,070 | 10/1990 | Markoff et al. ........... | 364/523 |
| 5,052,834 | 10/1991 | Feistel et al. ............ | 400/121 |
| 5,214,755 | 5/1993 | Mason ...................... | 395/147 |

OTHER PUBLICATIONS

McKinstry, "Mac: Multi-Ad Creator", Publish, vol. 4 No. 4 (Apr., 1989), pp. 70-72, Abstract Only.

Primary Examiner—Heather R. Herndon
Assistant Examiner—N. Kenneth Burraston
Attorney, Agent, or Firm—Foley & Lardner

[57] ABSTRACT

A graphic data output apparatus for creating and outputting graphic data including text or character data is provided with a superimposed text extracting device for extracting text superimposed on other text, a frequency measuring device for measuring the frequency of superimposition of the text at each available angle of the superimposed text and a text angle changing device for changing an angle of superimposed text so as to minimize a frequency of superimposition of the text. The superimposed text extracting device includes an approximation unit for approximating each superimposed text and other text into a rectangle or a circle. The frequency measuring device includes a text detecting unit for detecting text superimposed on an origin of other text and identifying the text from the other text. The text angle changing device includes an origin including text processing unit for changing an angle of the text from which text superimposed on an origin of other text is excluded. Further, there is provided a method of outputting graphic data capable of creating and outputting a plot drawing with convenient visual checking of the text without superimposition thereof.

11 Claims, 22 Drawing Sheets

GRAPHIC DATA OUTPUT APPARATUS AND METHOD OF CREATING AND OUTPUTTING GRAPHIC DATA

BACKGROUND OF THE INVENTION

The present invention relates to a graphic data output apparatus for creating and outputting graphic data including text or character data by use of computers and a method of creating and outputting such graphic data.

In the conventional graphic data output apparatus as shown in FIG. 1, to make graphic data into a plot drawing 110, graphic data are fetched from a graphic data file 111 by graphic data creating means 101. Plot data are created from graphic data, including text, by plot data creating means 102. A plot drawing 110 is created from the plot data by the plot drawing creating means 103.

In such a conventional graphic data output apparatus, graphic data are made into a plot drawing so as to accurately reproduce the input signal. When text 1 and 3, included in the graphic data are superimposed with each other as shown in FIG. 3, on the plot drawing the text are also superimposed with each other. Therefore, visual checking for identification between text 1 and text 3 on the plot drawing is difficult with.

SUMMARY OF THE INVENTION

Objects of the present invention are to overcome the disadvantage and to provide a graphic data output unit for creating and outputting a plot drawing without superimposing of the text and a method of creating and outputting graphic data with convenient visual checking for identification of the text.

A graphic data output apparatus according to the invention is provided with a creating and outputting means for creating and outputting graphic data including text, wherein provision is made of a superimposed text extracting means for extracting text superimposed on other text, a frequency measuring means for measuring the frequency of superimposition of the text in each available angle of the superimposed text and a text angle changing means for changing an angle of the superimposed text so as to minimize the frequency of superimposition of the text.

The superimposed text extract means preferably includes an approximation means for approximating either the superimposed text or the other text into a rectangle or a circle.

Further, the frequency measuring means preferably includes a text detecting means for detecting text superimposed on other text and identifying the text from the other text.

Further more, the text angle changing means preferably includes a origin including text processing means for changing an angle of the text from which the text superimposed on an origin of other text is excluded.

A method of creating and outputting graphic data including text comprises the steps of extracting text superimposed on other text, measuring frequency of superimposition of the text on other text in each available angles of the superimposed text and changing an angle of superimposed text so as to minimize frequency of superimposition of the text.

Further, the step of extracting superimposed text preferably includes a step of approximating each of superimposed text and other text into a rectangle or a circle.

Further more, the step of measuring frequency of superimposition of the text preferably includes a step of detecting text superimposed on an origin of other text and identifying the text from other text.

Still further, the step of changing a text angle includes a step of excluding an angle of the text from which text superimposed on an origin of other text from consideration.

A plot drawing without superimposed text may, therefore, be obtained with convenient visual checking for identification of the text.

BRIEF DESCRIPTION OF THE DRAWINGS

Preferred embodiments of a graphic data output apparatus and a method of creating and outputting graphic data including text according to the present invention will hereinafter fully be described with reference to the accompanying drawings.

PREFERRED EMBODIMENTS OF THE INVENTION

Figure 1:
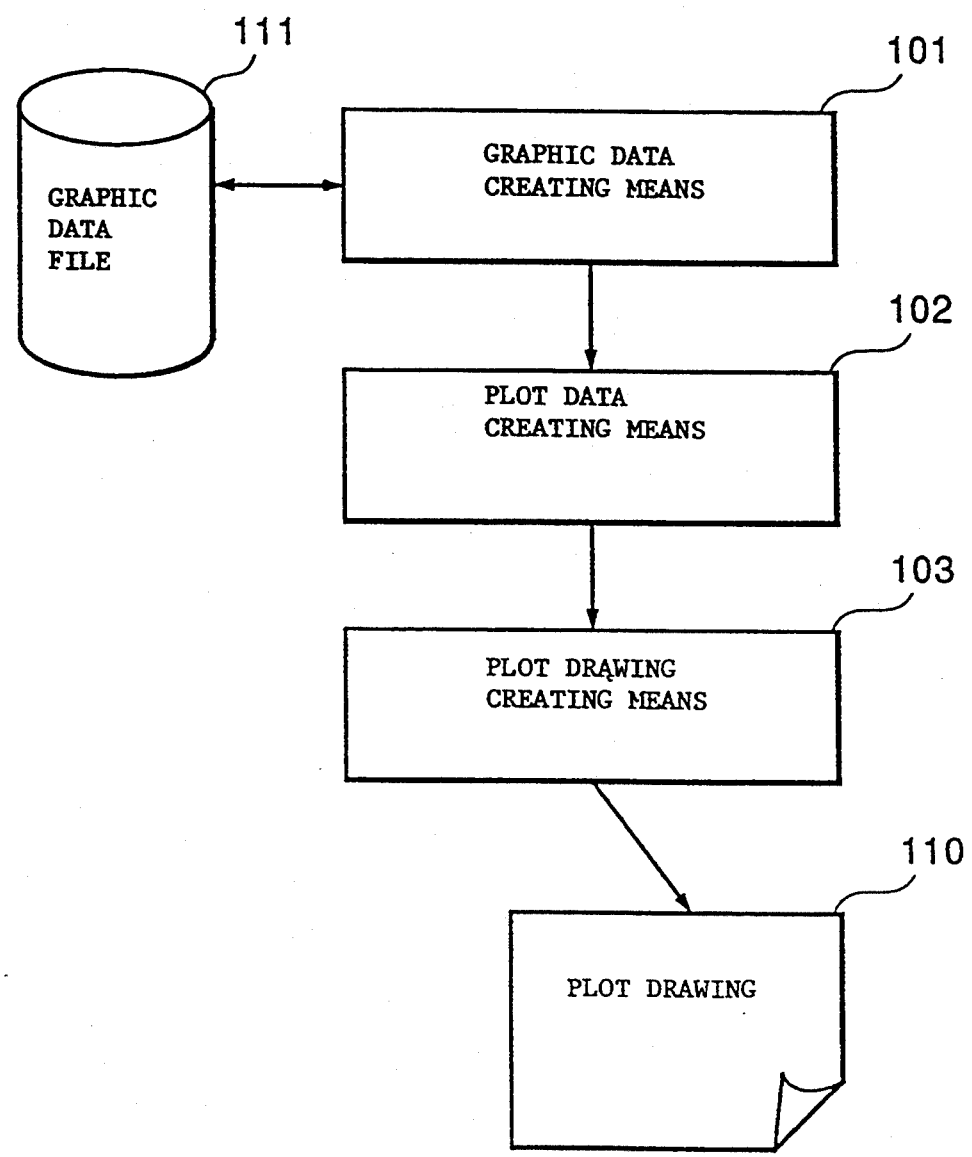
FIG. 1 is a fragmentarily block diagram of an example of the conventional graphic data output apparatus.

In a first embodiment according to the invention, a graphic data output apparatus with a graphic data creating means 101, a plot data creating means 102 and a plot drawing creating means 103 for creating and outputting a plot drawing 110 for graphic data including text is provided. The device also includes a superimposed text extract means 104 for extracting a text (text item) superimposed on other text (text item), a frequency measuring means 105 for measuring frequency of superimposition (i.e. the number of superimpositions of the text on other text) of the text in each available angles of the text and a text angle changing means for changing the superimposed text angles so as to minimize the frequency of superimposition of the text.

Further, the superimposed text extract means 104 includes an approximation means 104a for approximating either the superimposed text or other text to a rectangle or a circle.

Figure 2:
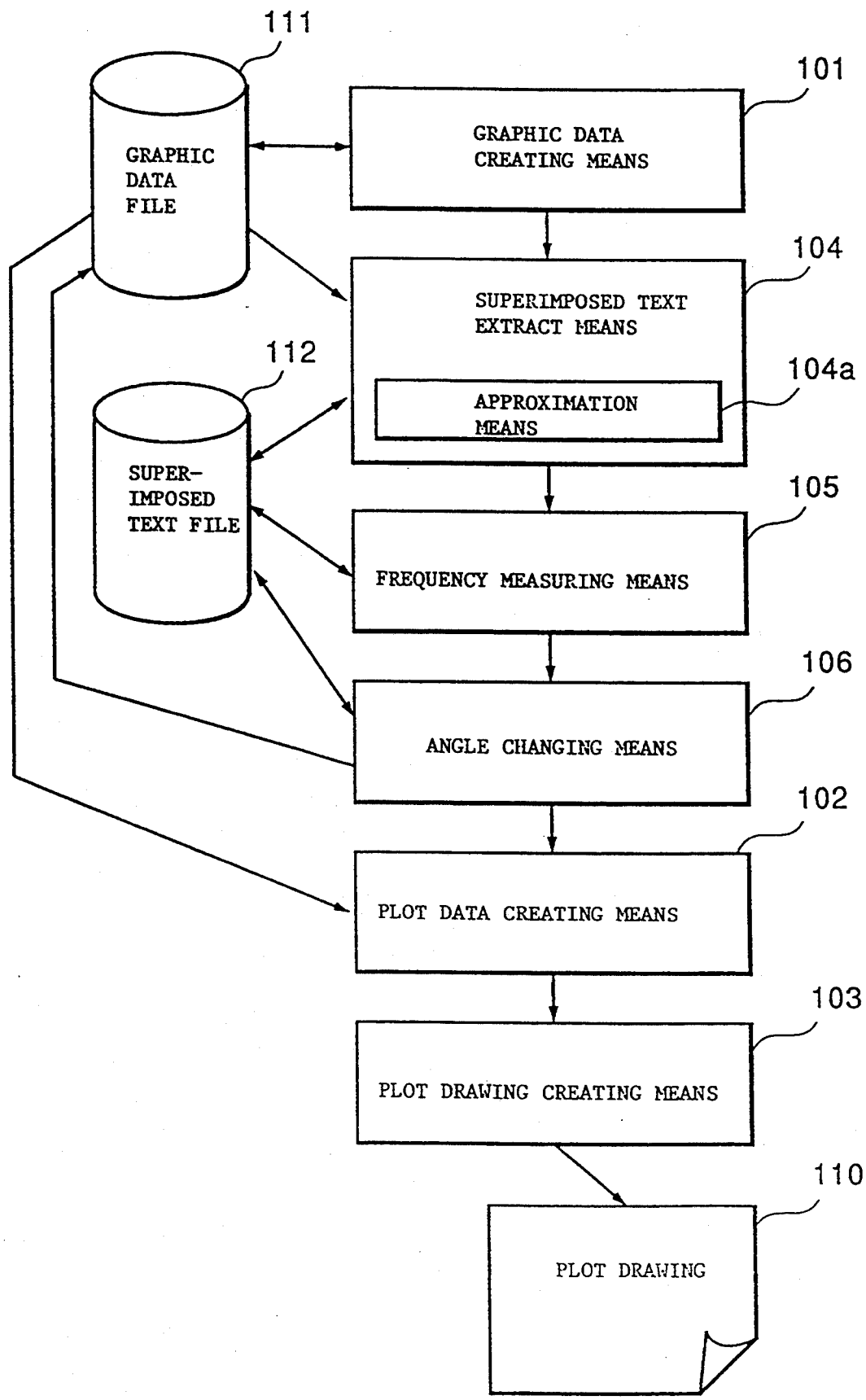
FIG. 2 is a fragmentarily block diagram of a first embodiment of a graphic data output apparatus and a method of creating and outputting graphic data including text according to the present invention.

In FIG. 2, numeral 111 depicts a graphic data file for storing graphic data and 112 a superimposed text file for storing superimposed text.

Figure 3:
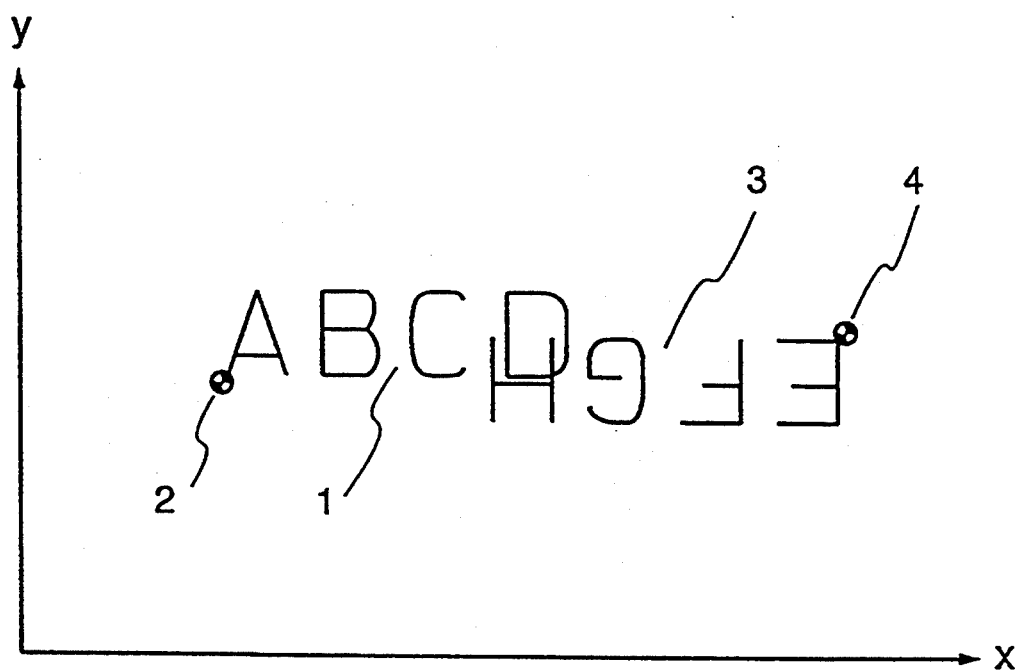
FIG. 3 is a pictorial view showing the superimposed text included in the graphic data of the first embodiment according to the invention.

In FIG. 3, text (1)1 of characters ABCD and text (2)3 of characters EFGH are superimposed with each other. Where numeral 2 depicts an origin (1) of the text (1)1 and 4 an origin (2) of the text (2)3. The text (1)1 has an original angle of 0 degrees and an available (or prescribed) angle ranged from 0 to 315 degrees at a pitch angle of 45 degrees and the text (2) 3 has an original angle of 180 degrees and an available angle ranged from 180 to 315 degrees and 0 to 135 degrees at a pitch angle of 45 degrees.

Figure 4:
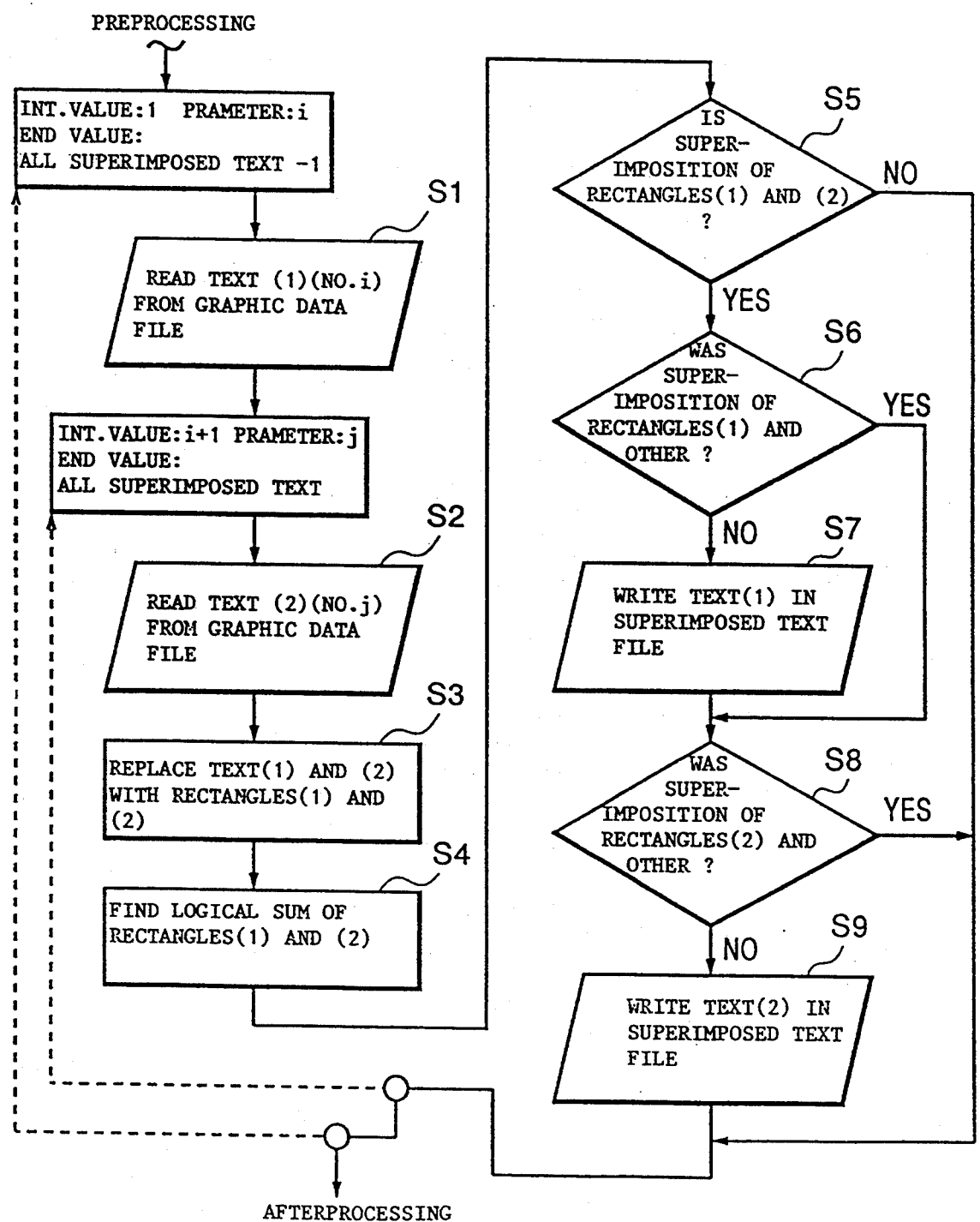
FIG. 4 is a flow chart of a text extract process of the superimposed text according to the invention.

In FIG. 4, at step 53 the text is replaced with a rectangle by an approximation means 104a and the replaced text is superimposed with each other is extracted.

Figure 5:
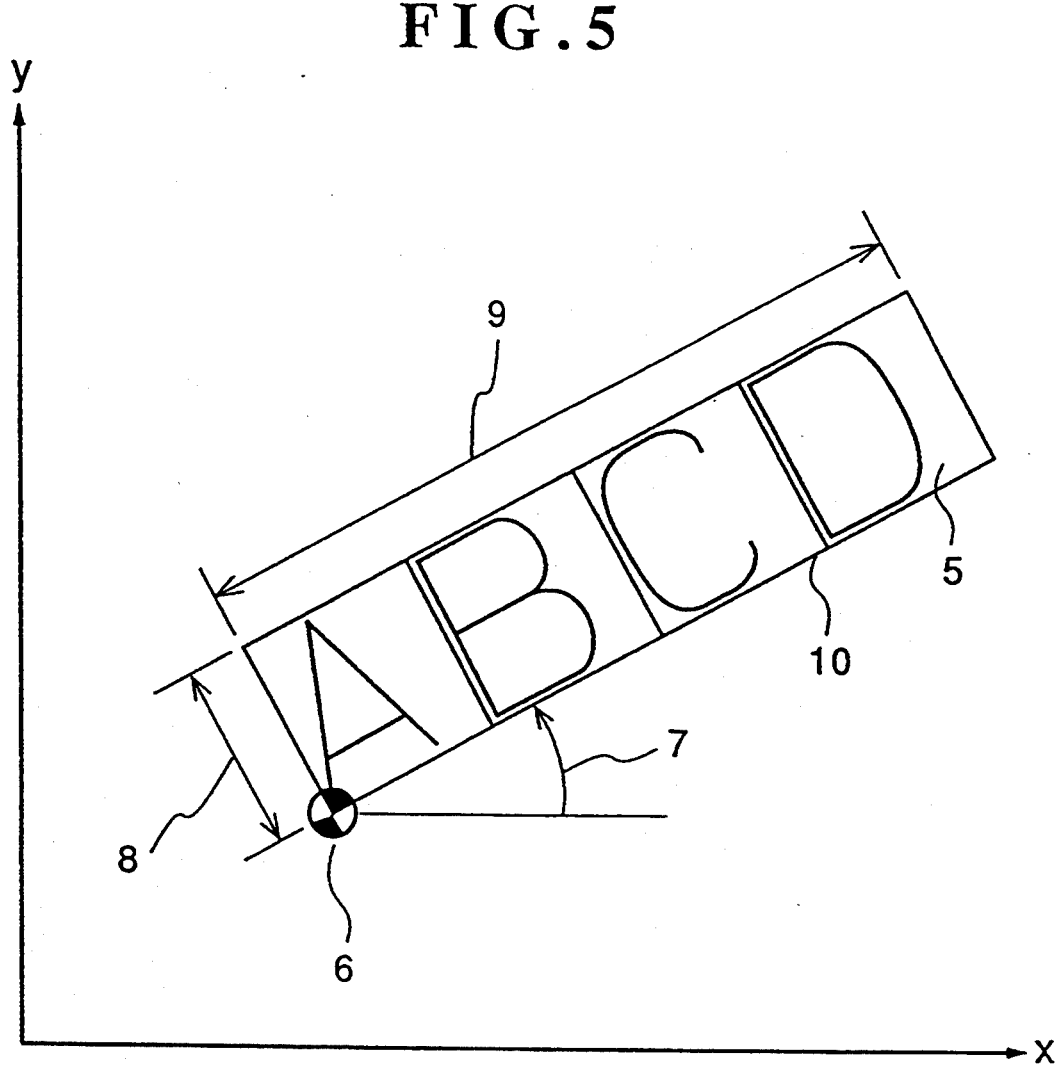
FIG. 5 is a pictorial view showing replacement of text with a rectangle according to the invention.

In FIG. 5, text 5 is replaced with a rectangle 10 of a longitudinal length 8 and a lateral length 9. The rectangle 10 has an original angle 7 produced by counterclockwise rotation around an origin 6.

Figure 6:
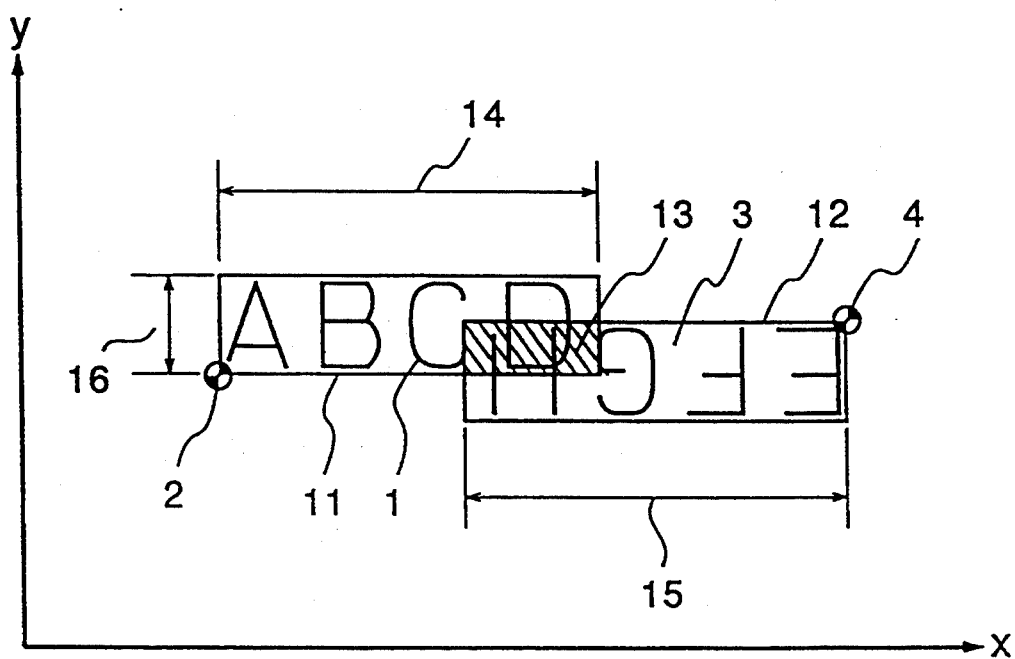
FIG. 6 is a pictorial view showing the text superimposed with each other according to the invention.

Two different text items text (1)1 and (2)3 are read from the graphic data file 111. The text (1)1 is replaced with a rectangle (1)11 of a longitudinal length (1)16 and a lateral length (1)14 (FIG. 6). The text (2)3 is replaced with a rectangle (2)12 of longitudinal length (1)16 and lateral length (2)15 by use of the step S3. A graphic logical sum operation of superimposition of the rectangle (1)11 and the rectangle (2)12 is executed to find superimposition thereof by use of the step S4 and S5. When each of the rectangles (1)11 and (2)12 are not superimposed on other text but are superimposed with each other, the text is written into the superimposed text file 112 of steps S6 to S9.

Figure 7:
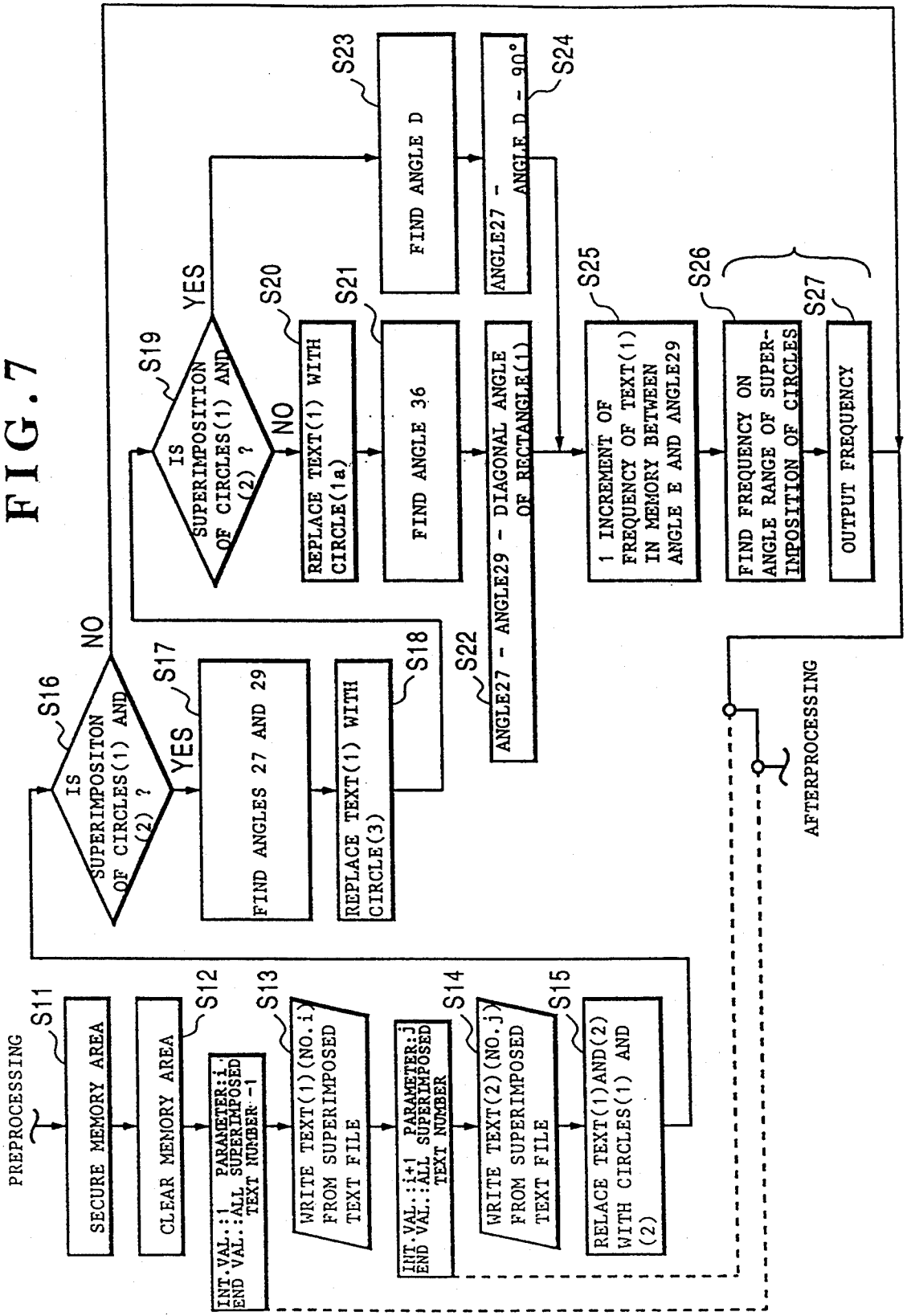
FIG. 7 is a flow chart of a frequency measuring process for measuring frequency of superimposition of the text according to the invent ion.
Figure 8:
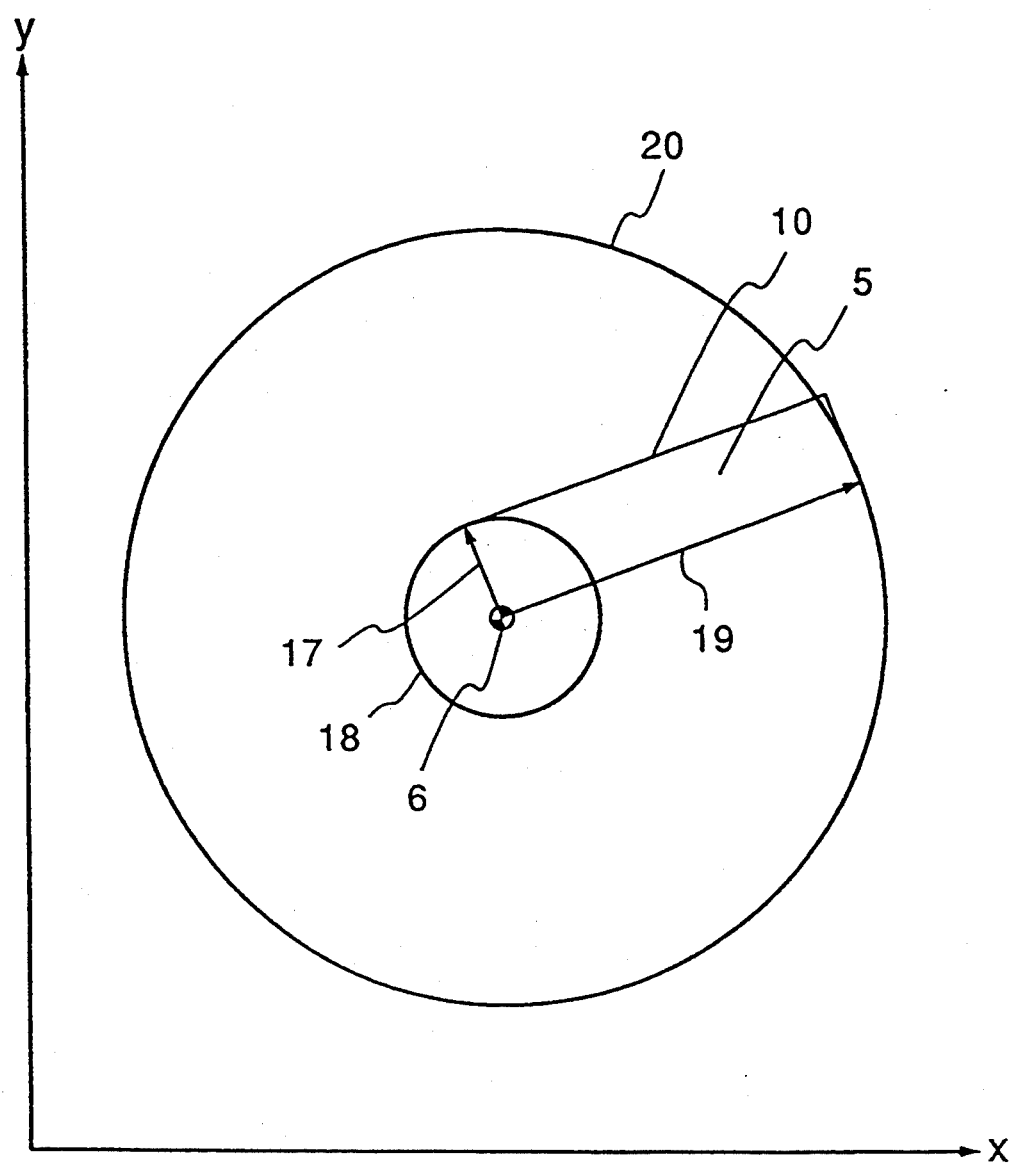
FIG. 8 is a pictorial view showing replacement of the text with a circle according to the invention.
Figure 9:
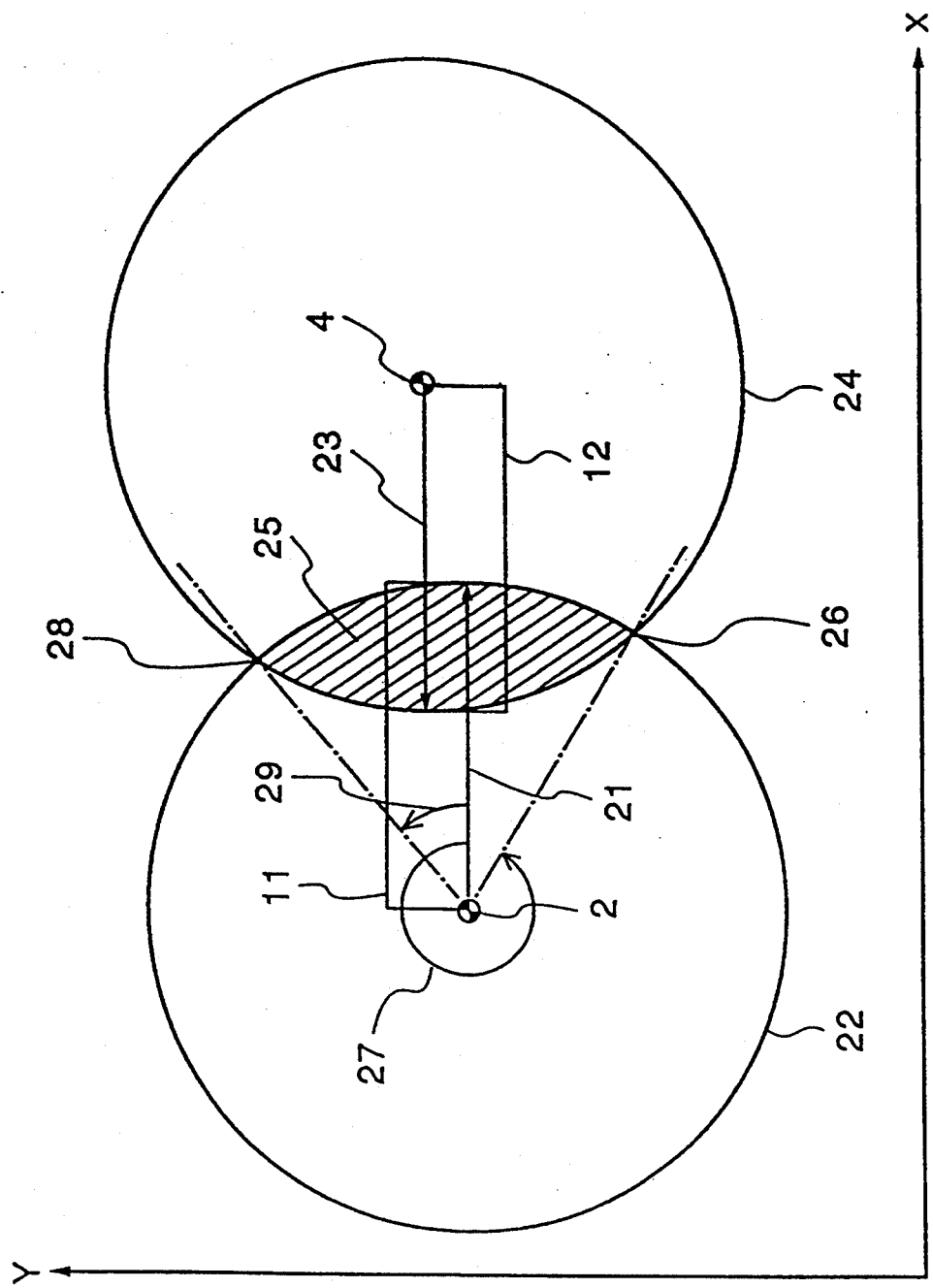
FIG. 9 is a pictorial view showing the text superimposed with each other according to the invention.

In FIGS. 7, 8 and 9, a memory area of the superimposed text file 112 for storing frequency data of superimposition of all superimposed text is secured by use of the step S11 and the memory area is cleared to zero by use of the step S12. Then, two deferent text (1)1 and (2)3 are read by use of the step S13 and S14 and are replaced with circles (2)22 and (2)24 so as to determine the superimposition thereof by use of the steps S15 and S16. Consequently, a range of angles in which circles are superimposed with each other is found by use of the step S17. In the step S15, the text 5 is replaced with a circle 20 of a center corresponding to the origin 6 of the text 5 and a radius 19 equal to a lateral length 9 of the text 5 and with a circle 18 of a center corresponding to the origin 6 of the text 5 and a radius 17 equal to a longitudinal length 8 of the text 5. In the step S17, when there is a superimposition 25 of a circle (1)22 and a circle (2)24, (FIG. 9) angles 27 and 29 are found.

Figure 10:
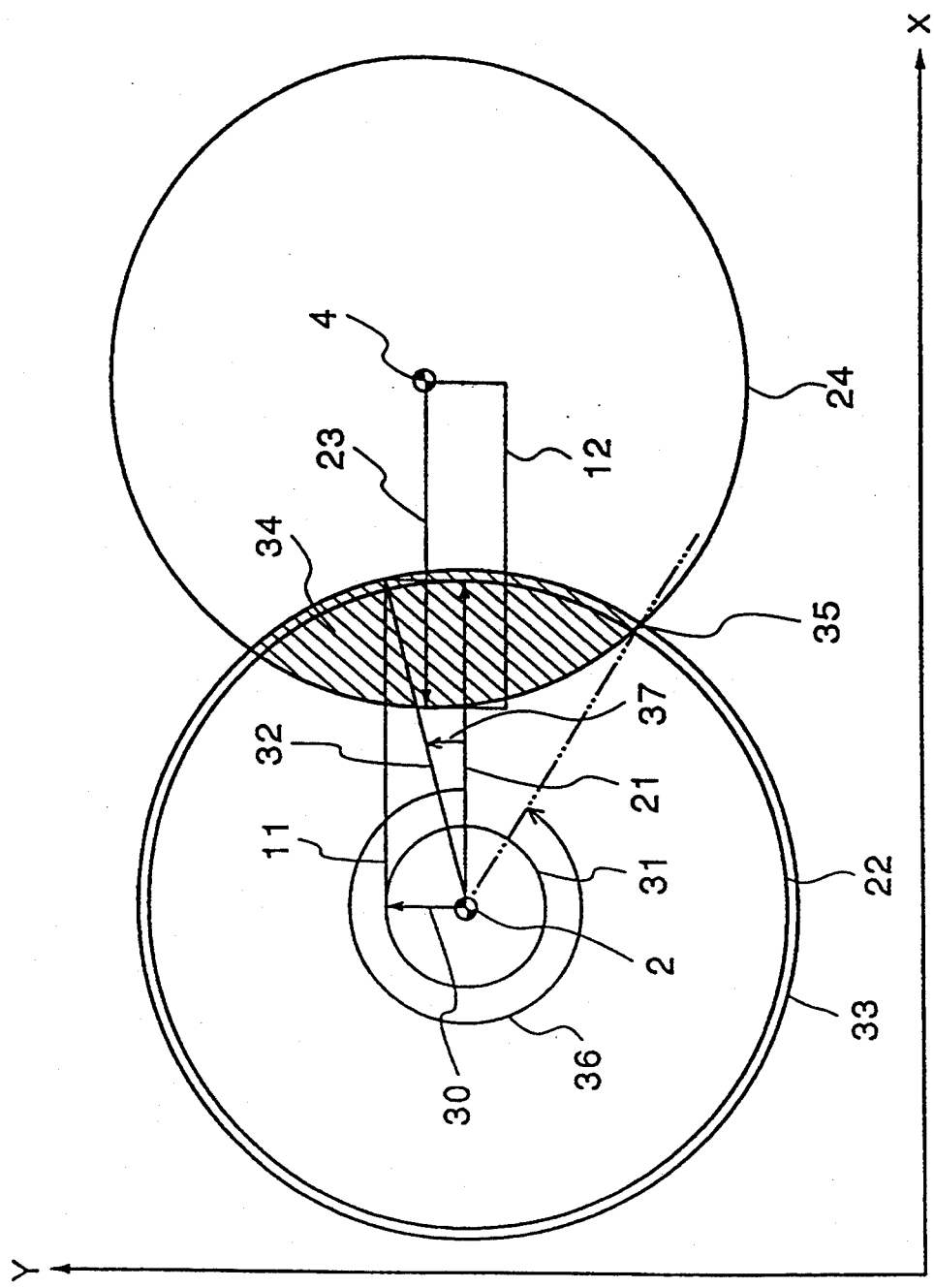
FIG. 10 is a pictorial view showing the text superimposed with each other in a process of changing the angle range thereof on the bases of a longitudinal length of the text.

In FIG. 10, the text (1)1 is replaced with a circle (3)31 of a center corresponding to an origin (1)2 of the text and a radius (3)30 equal to a longitudinal length (1) 16 of the text by use of the step S18 and superimposition of the circle (3)31 and the circle (2)24 are found by use of the step S19.

When there is no superimposition of the circle (3)31 and the circle (2)24, the text is replaced with a circle (1a)33 of a radius (1a)32 equal to a diagonal length of the rectangle (1)11 by use of the step S20 and an angle 36 is found by step S21. A value obtained by taking the angle 37 from the angle 36 is substituted to the angle 27 by use of the step S22.

Frequency data of superimposition of the text (1)1 in the memory is increased by one increment between the angle 27 and the angle 29 by use of the step S25.

When there is a superimposition of the circles (3)31 and (2)24, an angle D is found by use of step S23 and a value by taking the angle of 90 degrees from the angle D is substituted to the angle 27 by use of the step S24. For example, when an angle of the text (1)1 is 0 degrees between the angle 27 and the angle 29, frequency data of superimposition in the memory at 0 degrees is increased by one increment by use of the step S25.

In such process, the frequency of superimposition of the text (2)3 is found on the bases of an angle range in which circles are superimposed with each other by use of the step S26 and an output operation of the frequency data is executed by use of the step S27.

Figure 11:
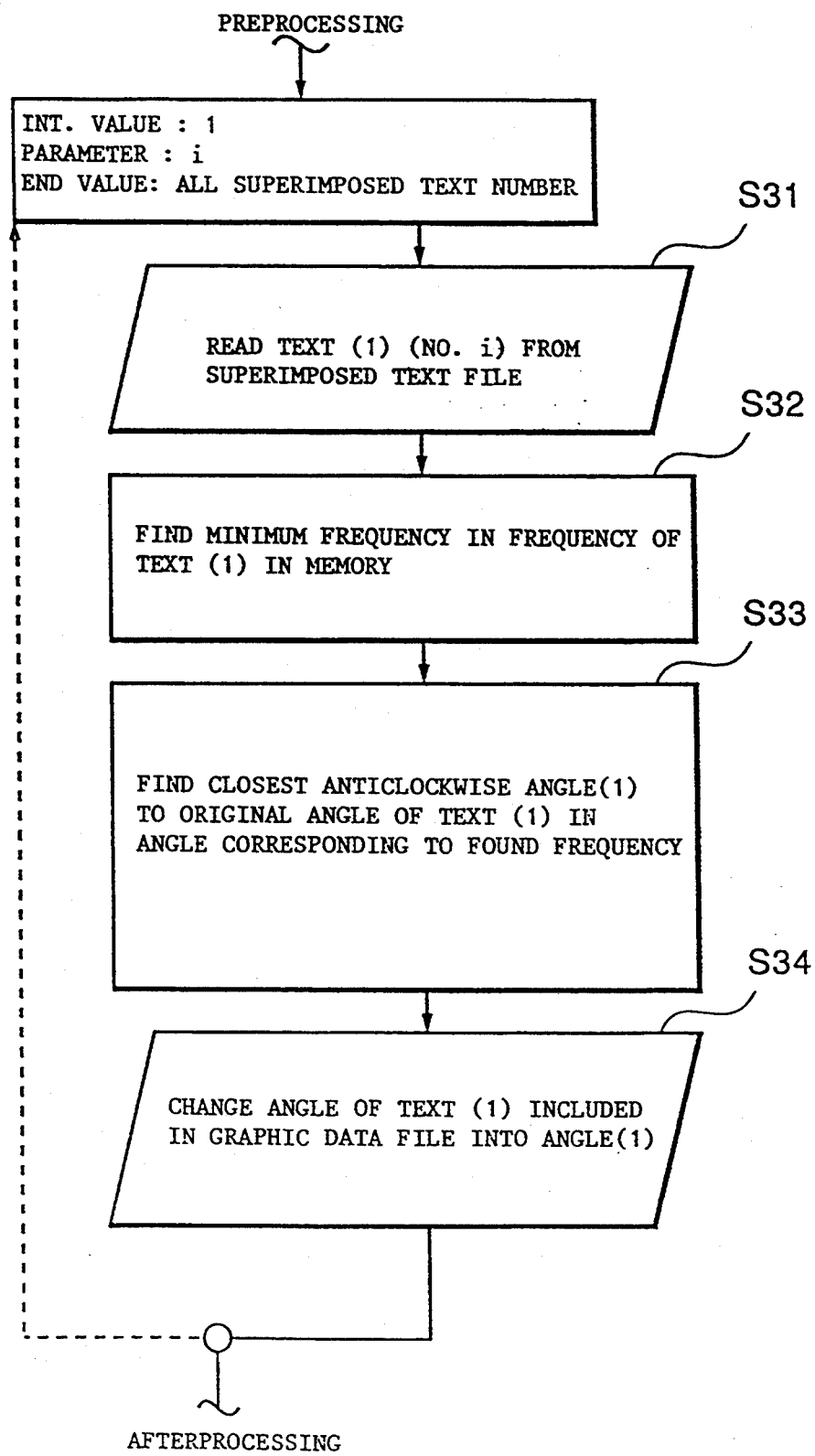
FIG. 11 is a flow chart of a text angle changing process for changing the angle of superimposed text so as to minimize frequency of superimposition thereof.

In FIG. 11, the text (1)1 numbered as (i) is read from the superimposed text file 112 by use of the step S31 and minimum frequency of superimposition of the text (1)1 in the memory is found by use of the step S32. Next, a closest angle to an original angle of the text (1)1 is found on the bases of available counterclockwise angles by use of the step S33. The original angle of the text in a graphic data file 111 corresponding to the text (1)1 is changed to the closest angle to the original angle of the text by use of the step S34.

An example of the above process will hereinafter be described with reference to the following table 1.

TABLE 1

| ANGLE OF TEXT (Degree) | FREQUENCY | |
|---|---|---|
| | TEXT (1) | TEXT (2) |
| 0 | (1) | 0 |
| 45 | 0 | 0 |
| 90 | 0 | 0 |

TABLE 1-continued

| ANGLE OF TEXT | FREQUENCY | |
|---|---|---|
| (Degree) | TEXT (1) | TEXT (2) |
| 135 | 0 | 0 |
| 180 | 0 | (1) |
| 225 | 0 | 0 |
| 270 | 0 | 0 |
| 315 | 0 | 0 |

( ): ORIGINAL ANGLE OF TEXT

In the table, when minimum frequency of the text (1)1 is 0 degrees, the angle of the text may be ranged from 45 degrees to 315 degrees. When the original angle of the text (1)1 is 0 degrees, the closest counterclockwise angle to the original angle is 45 degrees.

Figure 12:
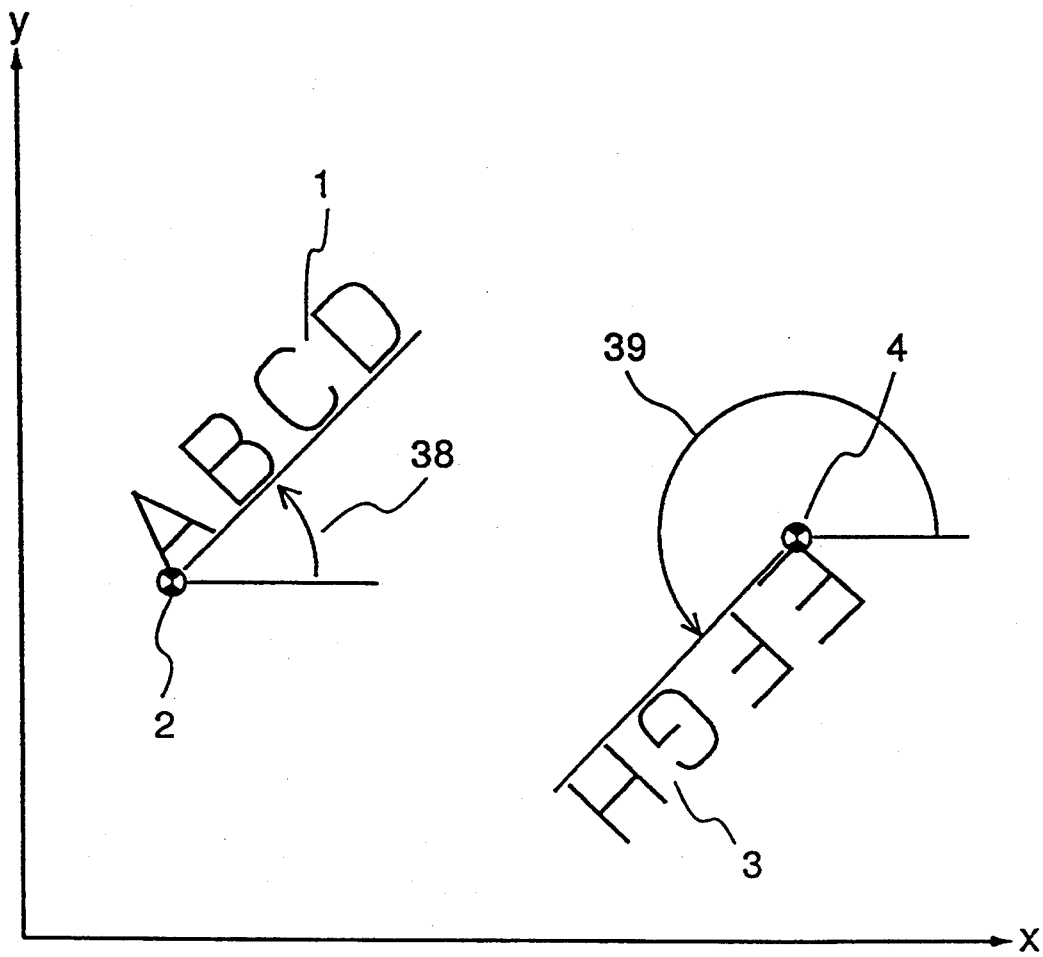
FIG. 12 is a pictorial view showing the text changed its angle in FIG. 3.

In FIG. 12, the original angles of the text (1)1 and (2)3 are respectively changed to angles (1)38 and (2)39.

The above processes are executed for all text included in the graphic data and the angle of each superimposed text is changed so as to minimize frequency of superimposition of the text before a plot drawing is created by use of the conventional method.

Figure 13:
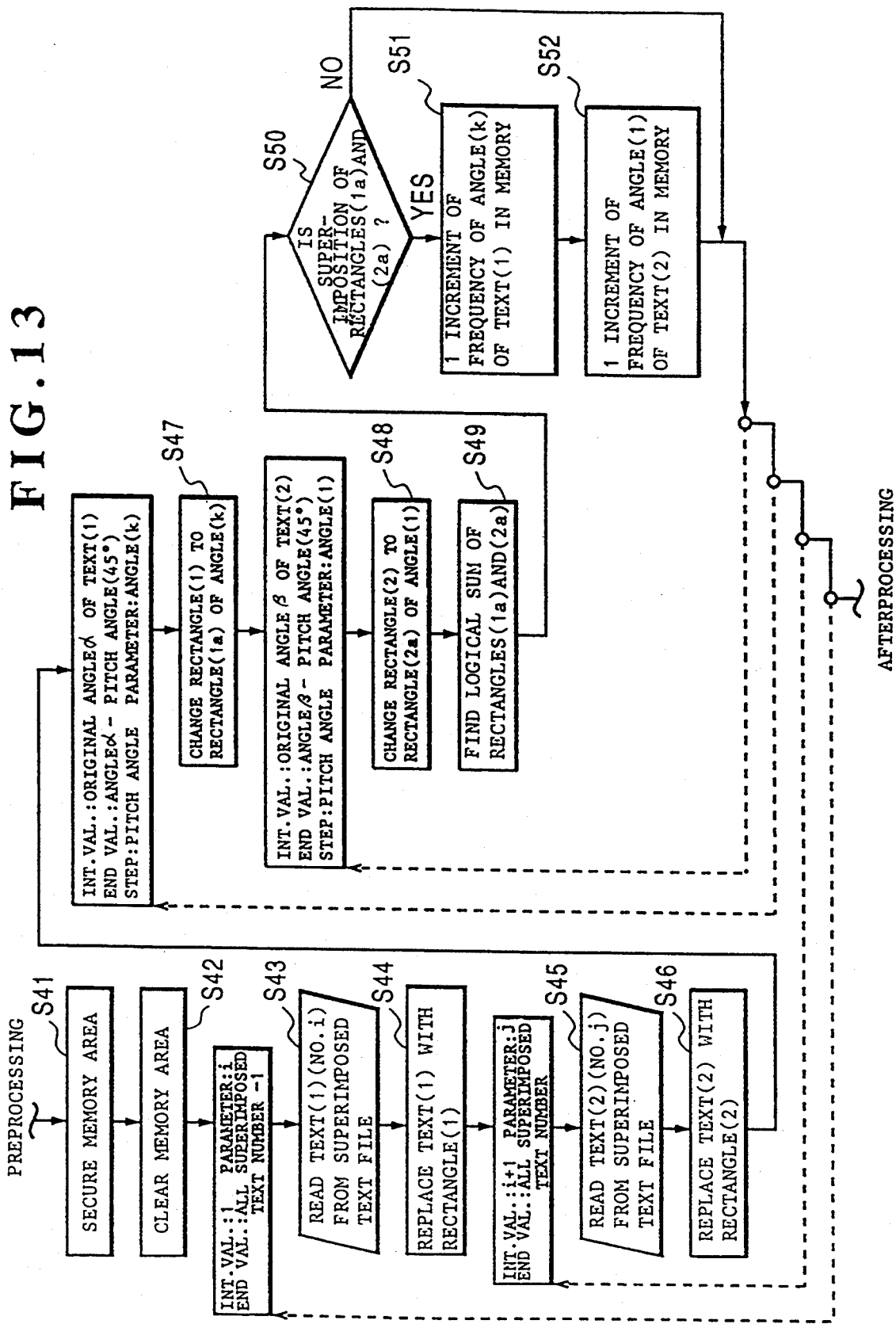
FIG. 13 is a flow chart of a frequency measuring process of superimposition of the text according to the invention.

In FIG. 13, the text is replaced with a rectangle, the angle of which is changed to find a frequency of superimposition of the text on other text.

Figure 14:
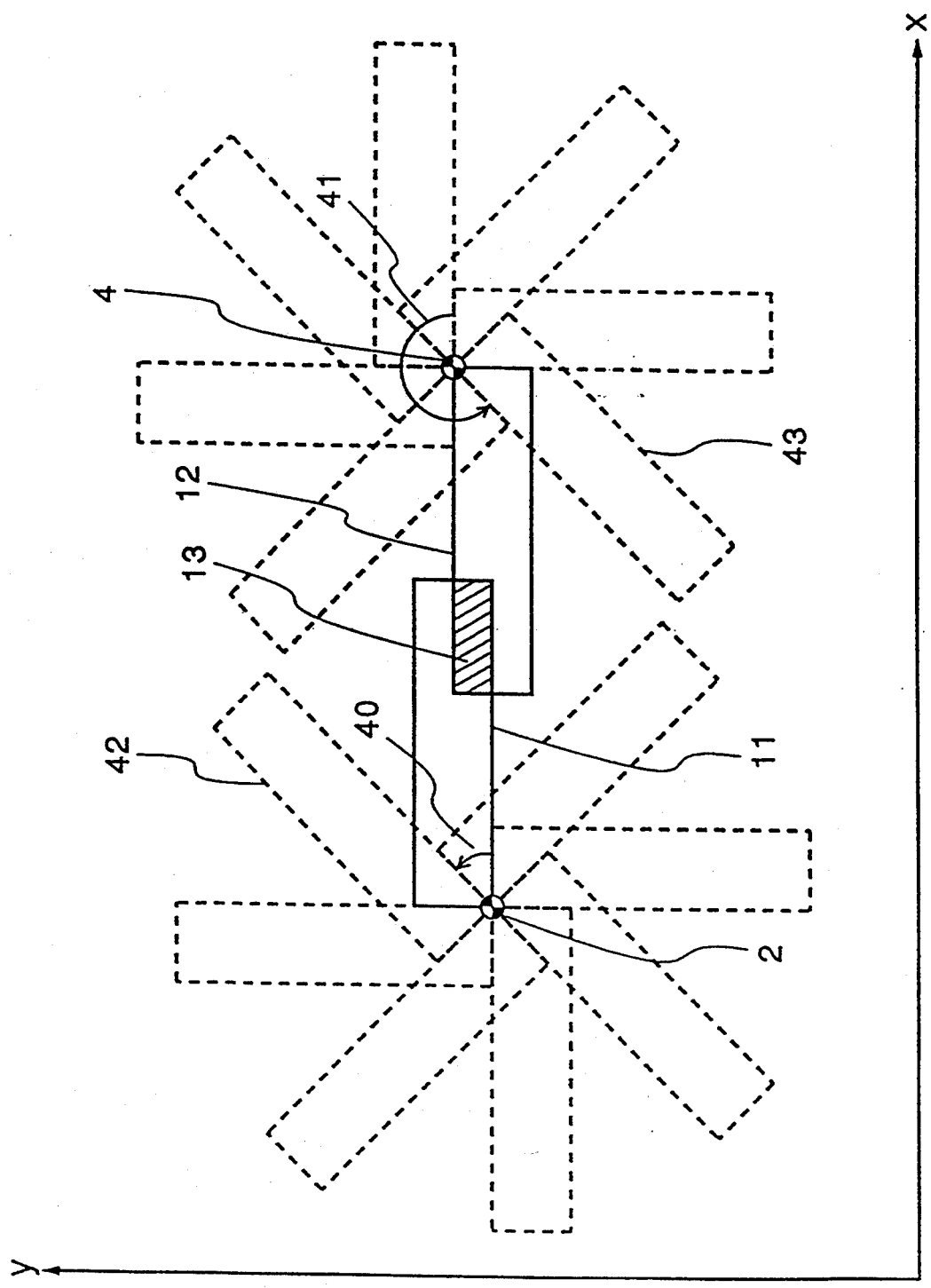
FIG. 14 is a pictorial view showing the text superimposed with each other according to the invention.

In FIG. 14, secured in the superimposed text file 112 is a memory area for storing frequency data of all superimposed text by use of the step S41 before the memory area is cleared to zero by use of the step S42. Consequently, two deferent text (1)1 and (2)3 are respectively read by use of the step S43 and S45 and are replaced with rectangles (1)11 and (2)12 by use of the step S44 and S46. Deferent angles (k)40 and (1)41 are found on the bases of available angles of the text (1)1 and (2)3. The rectangle (1)11 of an original angle α and the rectangle (2)12 of an original angle β are respectively made into a rectangle (1a)42 of an angle (k)40 and a rectangle (2a)43 of an angle (1)41 by use of the steps S47 and S48. Then, superimposition of the rectangles (1a)42 and (2a)43 is found by use of the steps S49 and S50. When there is a superimposition thereof, frequency data of each the angles (k)40 and (1)41 in the memory is increased by one increment by use of the steps S51 and S52. When the angle (k)40 and (1)41 are respectively equal to the original angles of the text (1)1 and (2)3, the rectangles (1a)42 and (2a)43 are superimposed with each other.

Figure 15:
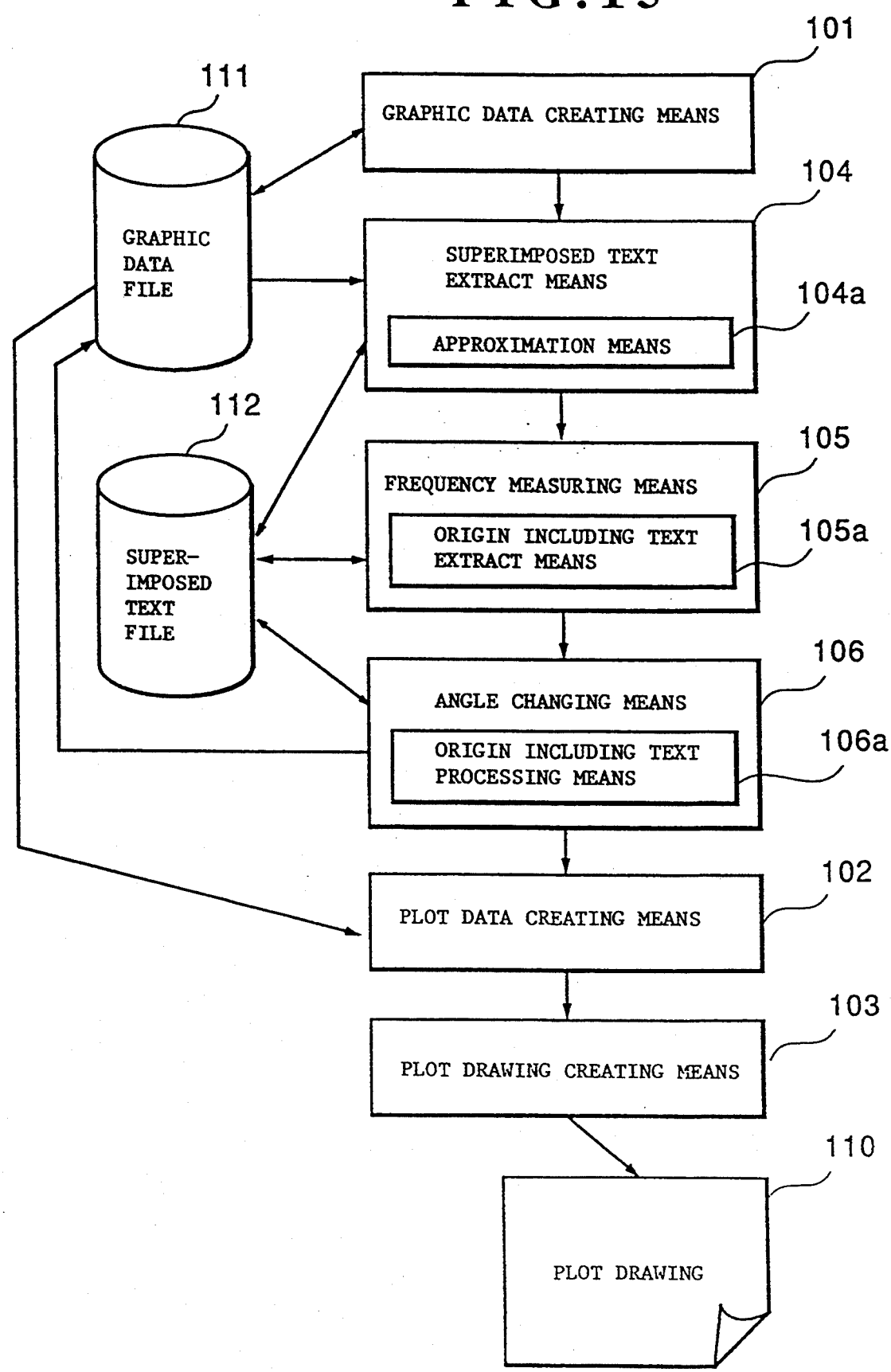
FIG. 15 is a fragmentarily block diagram of a second embodiment of a graphic data output apparatus and a method of creating and outputting graphic data including text according to the invention.

A second embodiment of the invention is hereinafter described in detail with reference to the drawings. In the second embodiment as shown in FIG. 15, the frequency measuring means 105 includes a text detecting means 105a for detecting text superimposed on an origin of other text and identifying the text from other text. The text angle changing means 106 includes a text processing means 106a for changing the angle of the text from which the text superimposed on an origin of other text is excluded.

Figure 16:
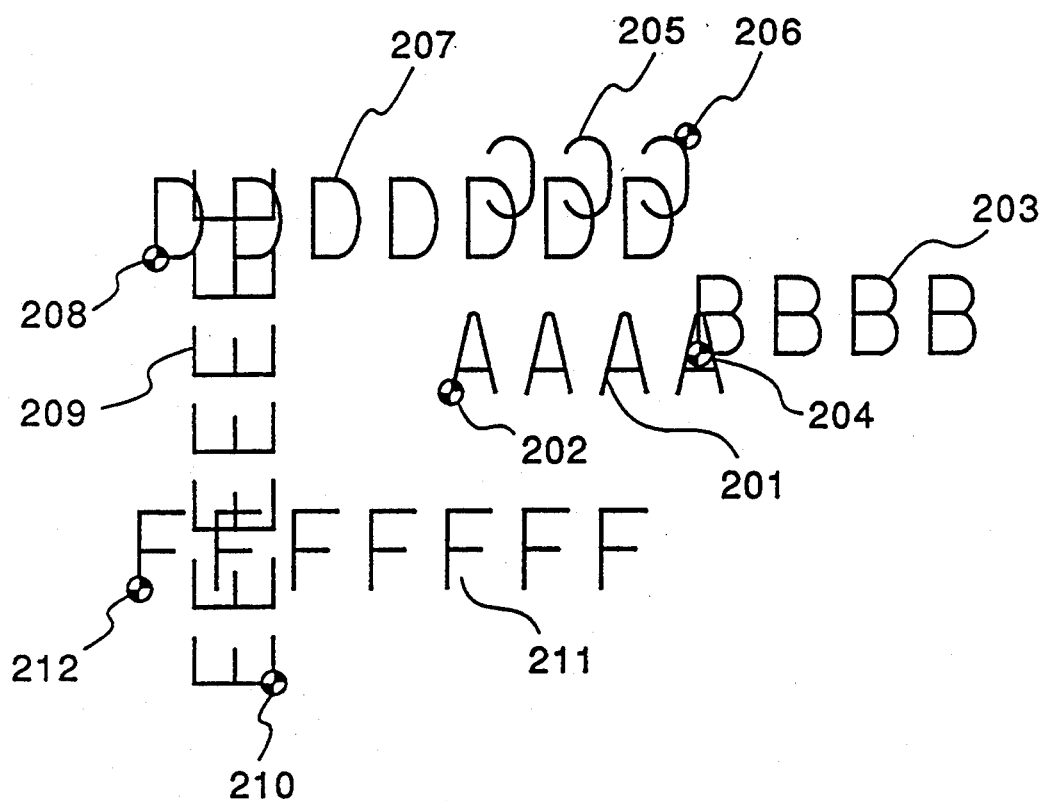
FIG. 16 is a pictorial view showing the text superimposed on an origin of other text in the second embodiment according to the invent ion.

In FIG. 16, text (1)201 of character AAAA and text (2)203 of character BBBB are superimposed with each other. Text (3)205 of character CCC and text (4)207 of character DDDDDDD are also superimposed with each other. Further, the text (4)207 and text (5)209 of character EEEEEEE are also superimposed with each other. Further more, the text (5)209 and text (6)211 of character FFFFFFF are superimposed with each other. Numeral 202 depicts an origin (1) of the text (1)201, 204 an origin (2) of the text (2)203, 206 an origin (3) of the text (3)205, 208 an origin (4) of the text (4)207, 210 an origin (5) of the text (5)209 and 212 an origin (6) of the text (6)211. Each of the text (1)201, (2)203, (4)207 and (5)209 has an original angle of 0 degrees and available angles ranged form 0 degrees to 315 degrees at the pitch angle of 45 degrees. Further, the text (3)205 has an original angle of 180 degrees and available angles ranged form 180 degrees to 315 degrees and from 0 degrees to 135 degrees at the pitch angle of 45 degrees. Still further, the text (6)211 has an original angle of 90 degrees and available angles ranged form 90 degree to 315 degrees and from 0 degrees to 45 degrees at the pitch angle of 45 degrees.

Figure 17:
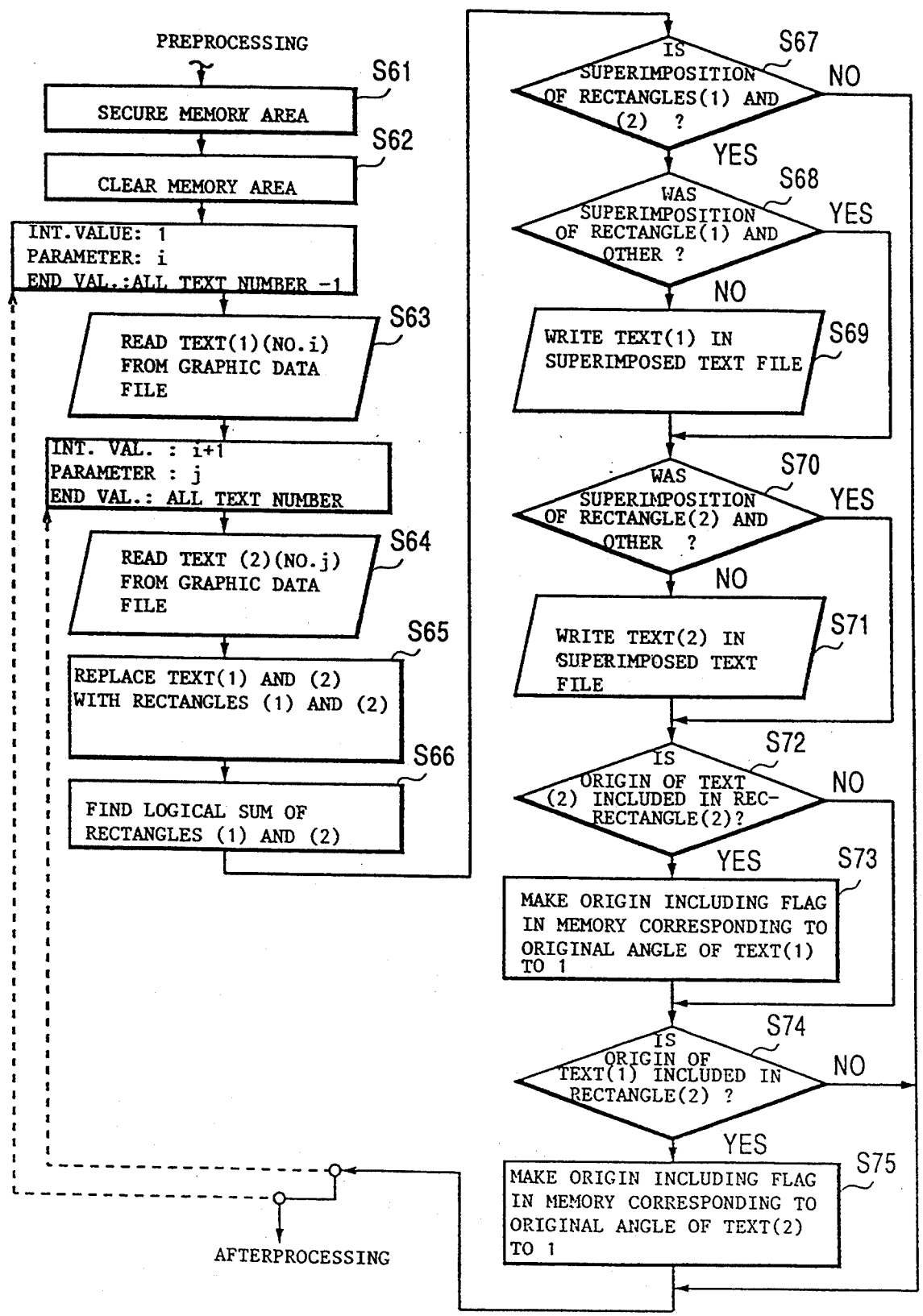
FIG. 17 is a flow chart of a text extracting process of the text superimposed on an origin of other text according to the invent ion.
Figure 18:
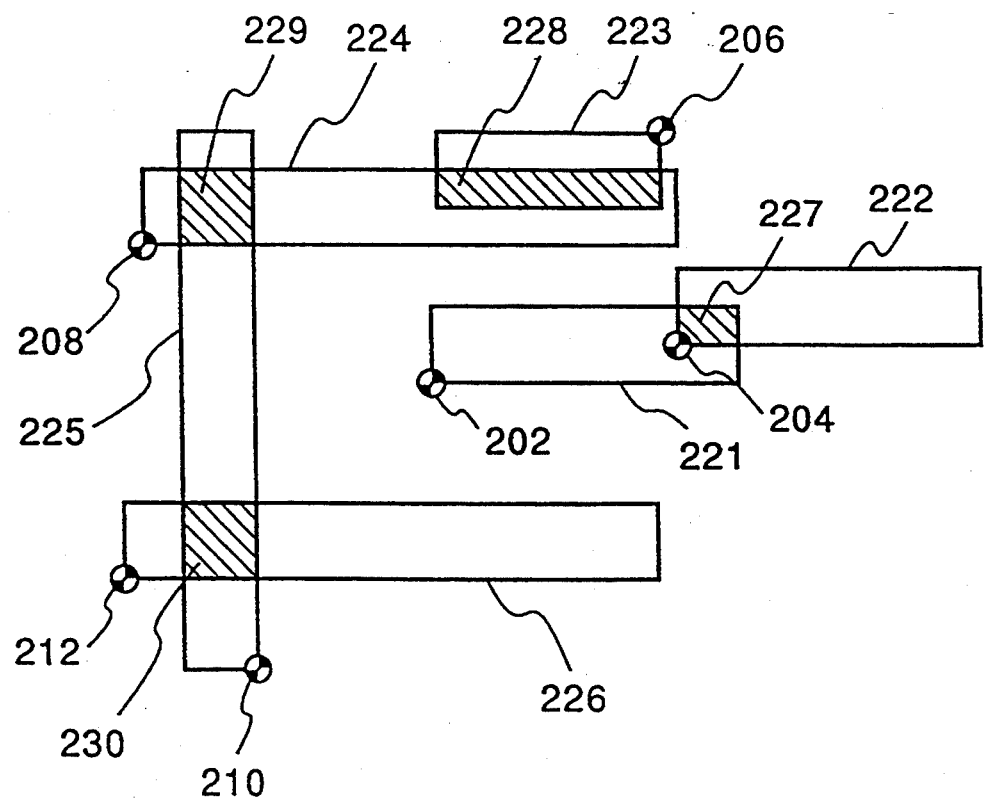
FIG. 18 is a pictorial view of the text superimposed on an origin of other text in the text extract process of FIG. 17.

In FIG. 17, the processes of the second embodiment comprises the steps from S63 to S71 corresponding to the steps from S1 to S9 of the first embodiment as shown in FIG. 4 and steps S61, S62 and S72 to S75. Secured in the superimposed text file 112 is a memory for storing data of an origin including a flag of each the superimposed text by use of the step S61 before the memory is cleared to zero by use of the step S62. The superimposed text are extracted by use of the method corresponding to the steps S1 to S9 of the first embodiment by use of the steps S63 to S71.

In FIG. 1.8, text (1)201 to (6)211 are replaced with rectangles (1)221 to (6)226. The rectangles (1)221 and (2)222 have a superimposition 227 of each other. The rectangles (3)223 and (4)224 also have a superimposition 228 of each other. Further, the rectangles (4)224 and (5)225 have a superimposition 229 thereof. Further more, the rectangles (5)225 and (6)226 also have a superimposition 230 of each other. Write operation of text (1)201 to (6)211 is executed in the superimposed text file 112 at step 571. Consequently, superimposition of the rectangle (1)221 on the origin of the text (2) of the rectangle (2)222 is found by use of the step S72. When the rectangle (1)221 is superimposed on the origin of the text (2), the value of the origin including flag corresponding to the original angle of the text in the memory is made into 1 by use of the step S73. Processes for the rectangle (2)222 are also executed by use of the above steps S72 and S73 and the steps S74 and S75.

Figure 19:
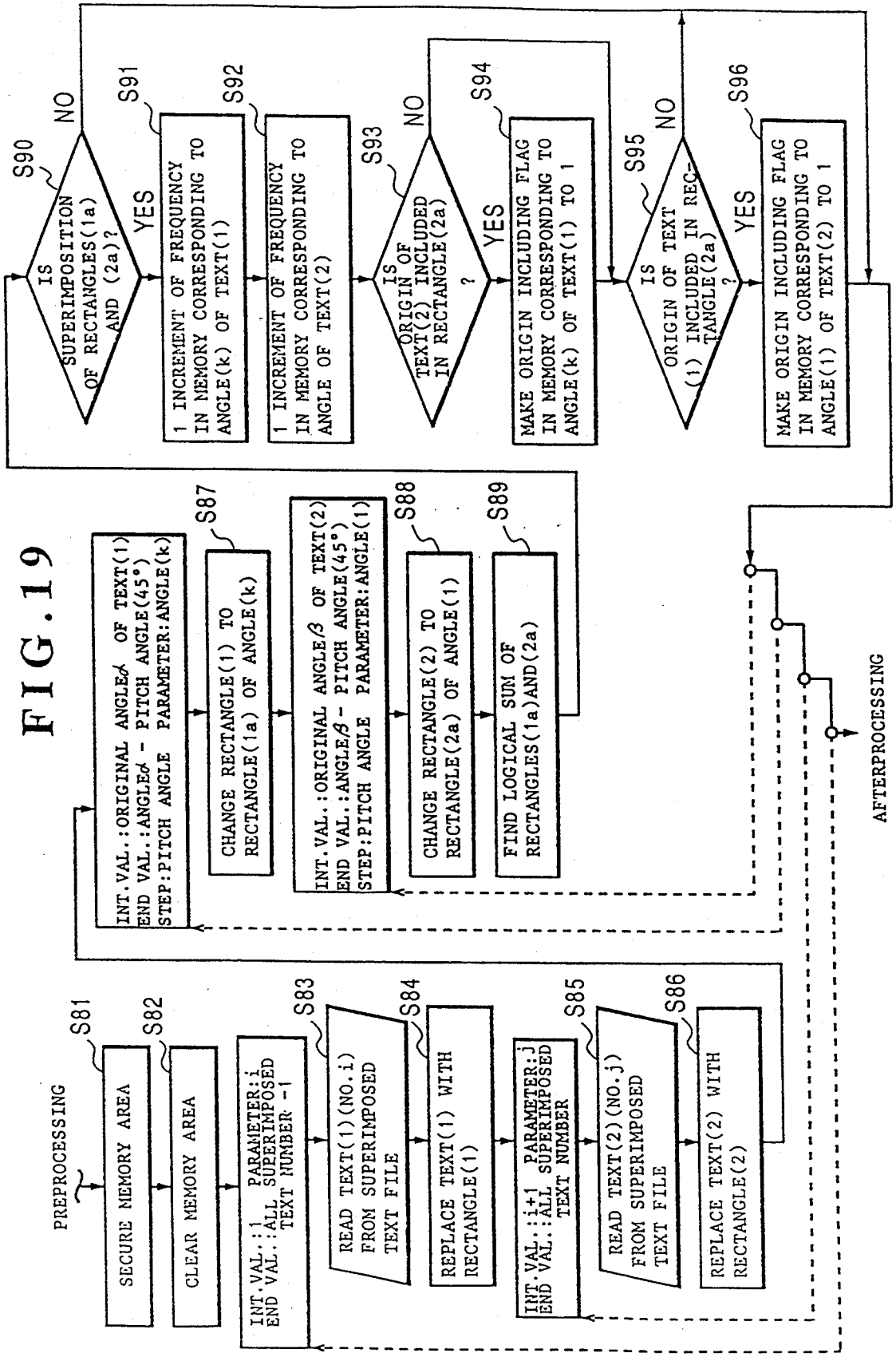
FIG. 19 is a flow chart of a frequency measuring process of superimposition of the text superimposed on an origin of other text according to the invention.

In FIG. 19, the processes of the second embodiment further comprises the steps from S81 to S92 corresponding to the above steps from S41 to S52 of the first embodiment as shown in FIG. 13 and more further steps S93 to S96.

Figure 20:
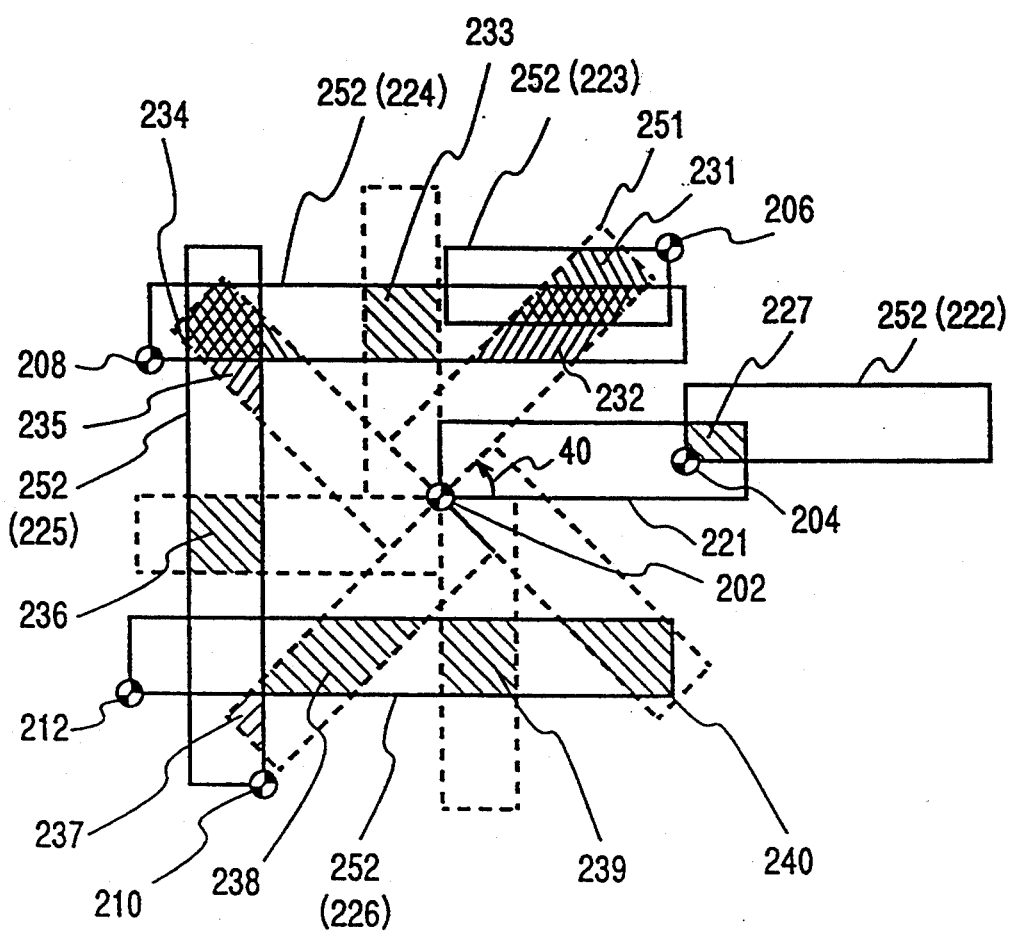
FIG. 20 is a pictorial view of the text superimposed on an origin of other text in the frequency measuring process of FIG. 19.

In FIG. 20, the text (1)201 is replaced with the rectangle (1)221 which is made into variable rectangle (1a)251 ranged between available angles thereof. The text (2)203, (3)205, (4)207, (5)209 and (6)211 are respectively replaced with rectangles (2)222, (3)223, (4)224, (5)225 and (6)226 which are made into rectangles (2a)252 at original angles thereof. In the variable angles of the rectangle (1)222, the variable rectangle (1a)251 is superimposed on the rectangles (2)222, (3)223, (4)224, (5)225 and (6)226. Namely, in the steps S81 to S91, the text are replaced with rectangles of which angles are ranged before frequency of superimposition of the text on other text is found.

At the angle of 0 degrees of the rectangle (1a)251 the variable rectangle (1a)251 has a superimposition 227 on the rectangle (2a)252. At the angle of 45 degrees of the variable rectangle (1a)251, the variable rectangle (1a)251 has superimpositions 231 and 232. At the angle of 90 degrees, the variable rectangle has a superimpositions 233. At the angle of 135 degrees, the variable rectangle (1a)251 has superimpositions 234 and 235. At the angle of 180 degrees of the rectangle (1a)251, it has a superimposition 236. At the angle of 225 degrees of the rectangle (1a)251, it has superimpositions 237 and 238. At the angle of 270 degrees of the rectangle (1a)251, it has a superimposition 239. At the angle of 315 degrees of the rectangle (1a)251, it has a superimposition 240.

Then, superimposition of the variable rectangle (1a)251 on an origin 204 of the text (2)203 corresponding to the rectangle (2a)252 is found by use of the step S93. Since the rectangle (1a)251 is superimposed on the origin 204 of the text (2)203, the value of the origin including flag corresponding to the original angle of the text (1)201 is made into 1 in the memory by use of the step S94. Processes for the variable rectangle (2a)252 are also executed by use of the above steps S95 and S96. Namely, the rectangle (1)221 is superimposed on the origin (2)204 of the text (2)203 corresponding to the rectangle (2)222. The value of the origin including flag corresponding to the original angle of the text (1)201 may be made into 1 in the memory.

Figure 21:
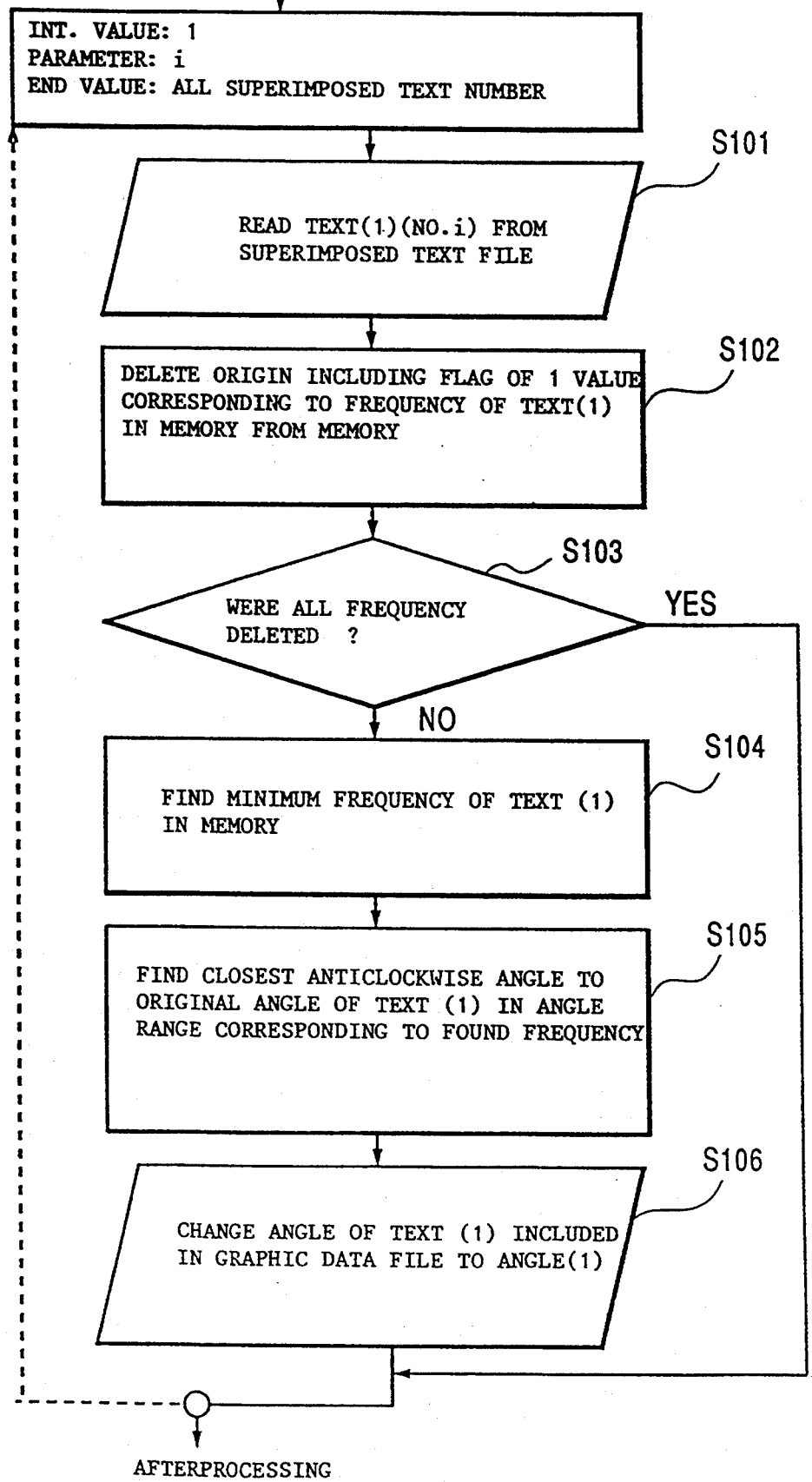
FIG. 21 is a flow chart of a text angle change process for changing angle of the text superimposed on an origin of other text so as to minimize frequency of superimposition thereof.

In FIG. 21, the processes for changing the angle of the superimposed text so as to minimize frequency of superimposition thereof comprises the steps S101 and S104 to S106 corresponding to the above mentioned processes as shown in FIG. 11 and further steps S102 and S103.

The single text (1)201 is read from the superimposed text file 112 by use of the step S101 corresponding to the above step. The frequency data corresponding to origin including flag value of 1 is deleted to be excluded from the processes by use of the step S102. Step S103 checks to if all frequency in the memory corresponding to the origin including flag of value 1 of the text (1)201. The step S103 before the angle changing processes of the superimposed text is executed by use of the steps S104 to S106 corresponding to the above steps S32 to S34 as shown in FIG. 11.

An example of the above processes will be described hereinafter with reference to the following table 2.

TABLE 2

| ANGLE OF TEXT (Degree) | TEXT (1) 201 | |
|---|---|---|
| | FREQUENCY | ORIGIN INCLUDING FLAG |
| 0 | (1) | 1 |
| 45 | 2 | 0 |
| 90 | 1 | 0 |
| 135 | 2 | 0 |
| 180 | 1 | 0 |
| 225 | 2 | 0 |
| 270 | 1 | 0 |
| 315 | 1 | 0 |

( ): TEXT ORIGINAL ANGLE

In the table 2, a value of the origin including flag of the text (1)201 is 1 at the angle of 0 degrees of the text and consequently frequency data of superimposition corresponding to the angle of 0 degrees is deleted from the memory. Since a minimum frequency of the superimposition corresponding to the angles ranged from 45 degrees to 315 degrees is 1 the available angle of the text may be either 90 degrees, 180 degrees, 270 degrees or 315 degrees. Accordingly, at the original angle of 0 degrees of the text, a counterclockwise angle closest to the original angle of the text (1)201 is 90 degrees among the available angles of the text.

Figure 22:
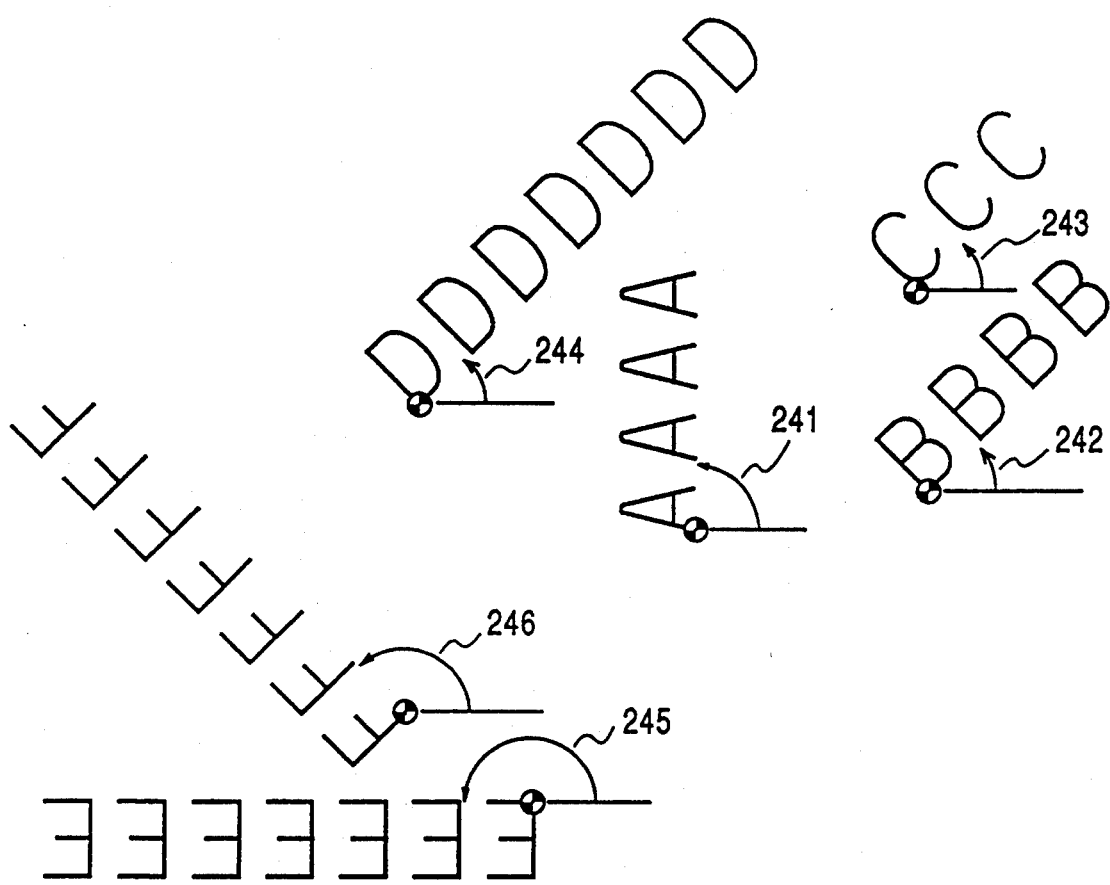
FIG. 22 is a pictorial view showing the text changed its angle and superimposed on an origin of other text in FIG. 16.

In FIG. 22, the original angles of the text ( 1 ) 201 to ( 6 ) 211 are respectively changed to angles (1)241, (2)242, (3)243, (4)244, (5)245 and (6)246.

As hereinbefore fully described, according to the second embodiment of the invention, the text superimposed on the origin of other text may be detected to prevent superimposition thereof. In the second embodiment, graphic data may be written in not only the plot drawings but also on a CRT display, for example. The pitch angle may also be set to constant angles other than 45 degrees or to variable angles. Further, in the angle changing process of the superimposed text, a counterclockwise angle closest to the original angle is found in the angles corresponding to the minimum frequency of superimposition of the text, but a clockwise angle may be found with the above advantages.

As hereinbefore fully described in detail, according to the present invention, the text superimposed on other text is extracted from the text included in the graphic data. In each of the available angles of the superimposed text, a frequency of superimposition of the text on other text is found and an angle of the minimum frequency of superimposition of the text is found so as to change the text angle to the angle of the minimum frequency. Then, plot drawings without superimposition of the text is obtained so as to permit convenient visual checking for identification of the text.

What is claimed is:

1. A graphic data output apparatus for outputting graphic data including text, comprising:
   a superimposed text extracting means for extracting a text item superimposed on one or more other text items;
   a frequency measuring means for measuring a frequency of superimposition of the text item on the other text items at each of a plurality of prescribed angles of the superimposed text item; and
   a text angle changing means for changing an angle of the text item so as to minimize the frequency of superimposition of the text item.

2. A graphic data output apparatus as claimed in claim 1, wherein the superimposed text extracting means includes an approximation means for approximating each of the text item and the other text items into one of a rectangle and a circle.

3. A graphic data output apparatus as claimed in claim 2, wherein the frequency measuring means includes a text detecting means for detecting whether the text item is superimposed on an origin of one or more of the other text items at any of said prescribed angles and identifying the text item and the prescribed angle which includes an origin.

4. A graphic data output apparatus as claimed in claim 2, wherein the text angle changing means includes an origin including text processing means for changing an angle of the text item at which the text item is superimposed on an origin of another text item to an angle which excludes an origin.

5. A graphic data output apparatus as claimed in claim 1, wherein the frequency measuring means includes a text detecting means for detecting whether the text item is superimposed on an origin of one or more of the other text items at any of said prescribed angles and identifying the text item and a prescribed angle which includes an origin.

6. A graphic data output apparatus as claimed in claim 1, wherein the text angle changing means includes an origin including text processing means for changing an angle of the text item at which the text item is superimposed on an origin of another text item to an angle which excludes an origin.

7. A method of outputting graphic data including text comprising the steps of:
   extracting a text item superimposed on one or more other text items;
   measuring a frequency of superimposition of the text item on other text items for each of a prescribed number of angular positions of the superimposed text item; and
   changing an angle of the text item to one of the prescribed angular positions so as to minimize the frequency of superimposition of the text item on the other text items.

8. A method of outputting graphic data including text as claimed in claim 7, wherein the step of extracting superimposed text includes a step of approximating the text item and each of the other text items into one of a rectangle and a circle.

9. A method of outputting graphic data including text as claimed in claim 7, wherein the step of measuring the frequency of superimposition of the text includes a step of detecting whether the text item is superimposed on an origin of another text item and identifying the text item as including an origin.

10. A method of outputting graphic data including text as claimed in claim 7, wherein the step of changing a text angle excludes any of the prescribed angular positions at which the text item is superimposed on an origin of any of the other text items.

11. A method of generating a graphic image of graphic data including a plurality of text items such that the degree of superimposition of said plurality of text items in said graphic image is reduced, said method comprising the steps of:
   identifying a superimposed text item which is superimposed on one or more of said text items;
   rotating said text item through a plurality of angular positions;
   measuring an amount of superimposition of said superimposed text item on other text items at each of said angular positions;
   selecting an angular position corresponding to a minimum amount of superimposition measured in said measuring step; and
   generating an output image having said superimposed text rotated to said angular position selected in said selecting step.

* * * * *